US008817685B2

(12) United States Patent
Mukherjee et al.

(10) Patent No.: US 8,817,685 B2
(45) Date of Patent: Aug. 26, 2014

(54) ENERGY-EFFICIENT UNDERLAY DEVICE-TO-MULTIDEVICE COMMUNICATIONS WITH INTERFERENCE SUPPRESSION

(75) Inventors: Amitav Mukherjee, Irvine, CA (US); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 332 days.

(21) Appl. No.: 13/279,704

(22) Filed: Oct. 24, 2011

(65) Prior Publication Data

US 2013/0100864 A1 Apr. 25, 2013

(51) Int. Cl.
*H04H 20/71* (2008.01)
*H04B 7/04* (2006.01)

(52) U.S. Cl.
CPC ................ *H04B 7/0456* (2013.01)
USPC .......... 370/312; 370/310.2; 370/317

(58) Field of Classification Search
USPC ......... 370/241, 252, 312, 318, 477; 455/63.1, 455/114.2, 278.1, 296
See application file for complete search history.

(56) References Cited

U.S. PATENT DOCUMENTS

| 6,101,176 | A | 8/2000 | Honkasalo et al. |
| 7,653,160 | B2 * | 1/2010 | Piirainen ........................ 375/346 |
| 7,974,652 | B2 * | 7/2011 | Gerlach et al. ................ 455/522 |
| 8,190,094 | B2 * | 5/2012 | Kim et al. ..................... 455/63.1 |
| 8,218,422 | B2 * | 7/2012 | Venturino et al. ............ 370/208 |
| 8,256,407 | B2 * | 9/2012 | Kawasaki et al. .......... 125/16.01 |
| 8,666,403 | B2 * | 3/2014 | Yu et al. ..................... 455/435.1 |
| 2008/0057996 | A1 * | 3/2008 | Sung et al. .................... 455/522 |
| 2010/0093364 | A1 | 4/2010 | Ribeiro et al. |
| 2010/0240312 | A1 * | 9/2010 | Peng et al. .................... 455/63.1 |
| 2010/0261469 | A1 | 10/2010 | Ribeiro et al. |
| 2011/0045864 | A1 * | 2/2011 | Chen et al. ..................... 455/522 |
| 2011/0116410 | A1 * | 5/2011 | Sung et al. ..................... 370/252 |
| 2011/0134790 | A1 * | 6/2011 | Jiang ............................. 370/252 |
| 2012/0099540 | A1 * | 4/2012 | Doppler et al. ............... 370/329 |
| 2012/0100877 | A1 * | 4/2012 | Zangi et al. .................... 455/501 |
| 2013/0250885 | A1 * | 9/2013 | Davydov et al. .............. 370/329 |
| 2013/0344909 | A1 * | 12/2013 | Davydov et al. .............. 455/501 |

FOREIGN PATENT DOCUMENTS

WO 2010084411 A1 7/2010

OTHER PUBLICATIONS

Mukherjee and Hottinen, "Learning Algorithms for Energy-Efficient MIMO Antenna Subset Selection: Multi-Armed Bandit Framework", EURASIP, Aug. 2012.*
Mukherjee and Hottinen, "Energy-Efficient Device-to-Device MIMO Underlay Network With Interference Constraints", IEEE, Mar. 2012.*
Xu, Wang, Chen, Huang, and Peng, "Effective Interference Cancellation Scheme for Device-to-Device Communication Underlaying Cellular Networks", IEEE, Sep. 2010.*

(Continued)

*Primary Examiner* — Brian O'Connor
(74) *Attorney, Agent, or Firm* — Squire Patton Boggs (US) LLP

(57) ABSTRACT

A method for performing device-to-multidevice communication with interference suppression is provided. The method may include selecting at least one receiving user equipment for D2MD transmission, and receiving requested data rates from the selected at least one receiving user equipment. The method may further include acquiring CSI matrices and identifying interference constraints to the C-UEs sharing the same frequency band as the at least one receiving user equipment. The method then includes determining precoding matrices using the acquired CSI matrices and the identified interference constraints to the C-UEs, and performing D2MD transmission to the at least one receiving user equipment using the determined precoding matrices.

26 Claims, 4 Drawing Sheets

(56) References Cited

OTHER PUBLICATIONS

IEEE Transactions on Wireless Communications, "Resource Sharing Optimization for Device-to-Device Communication Underlaying Cellular Networks," C.-H. Yu, K. Doppler, C.B. Riberio, and O. Tirkkonen; NRC/Aalto University, vol. 10, No. 8, Oct. 2011.

IEEE 2009 conference paper, "Interference-aware Resource Allocation for Device-to-Device Radio Underlaying Cellular Networks" P. Janis et al., NRC/Aalto University.

IEEE 2011 conference paper, "Dynamic Powaer Control Mechanism for Interference Coordination of Device-to-Device Communication in Cellular Networks" J. Gu et al.

Sec. III-B of Q. Spencer & A.L. Swindlehurst, "Zero-Forcing Method for Downlink Spatial Multiplexing in Multi-User MIMO Channels," IEEE Trans. Signal Processing, Feb. 2004.

Jing Jin et al., "A Novel Cooperative Multi-Cell MIMO Scheme for the Downlink of LTE-Advanced System", Wireless Theories and Technologies Lab, Beijing University, Beijing, P.R. China, copyright 2009.

Jing Jin et al., "Coordinated Multi-Point Transmission with Limited Feedback", Wireless Theories and Technologies Lab, Beijing University, Beijing, P.R. China, copyright 2010.

Chenzi Jiang, et al., "Energy-Efficient Multiuser MIMO Beamforming", University of Delaware, DE 19716, copyright 2011.

Ching-Chih Weng et al., "Per-Antenna Power Constrained MIMO Transceivers Optimized for BER", California Institute of Technology, Pasadena, CA 91125, USA, copyright 2008.

\* cited by examiner

ENERGY-EFFICIENT UNDERLAY DEVICE-TO-MULTIDEVICE COMMUNICATIONS WITH INTERFERENCE SUPPRESSION

BACKGROUND

1. Field

Embodiments of the invention relate to wireless communications networks, such as the Universal Mobile Telecommunications System (UMTS) Terrestrial Radio Access Network (UTRAN) Long Term Evolution (LTE) and Evolved UTRAN (E-UTRAN), and to device-to-device links that enable direct communication of data between user equipment.

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

SUMMARY

One embodiment is directed to a method for performing device-to-multidevice communication with interference suppression. The method may include selecting at least one receiving user equipment for device-to-multidevice transmission, and receiving requested data rates from the selected at least one receiving user equipment. The method may further include acquiring channel state information matrices and identifying interference constraints to the cellular user equipment sharing the same frequency band as the at least one receiving user equipment. The method then includes determining precoding matrices using the acquired channel state information matrices and the identified interference constraints to the cellular user equipment, and performing device-to-multidevice transmission to the at least one receiving user equipment using the determined precoding matrices.

Another embodiment is directed to an apparatus. The apparatus includes at least one processor and at least one memory including computer program code. The at least one memory and the computer program code are configured, with the at least one processor, to cause the apparatus at least to select at least one receiving user equipment, receive requested data rates from the selected at least one receiving user equipment, acquire channel state information matrices, identify interference constraints to cellular user equipment sharing same frequency band as the at least one receiving user equipment, determine precoding matrices using the acquired channel state information matrices and the identified interference constraints to the cellular user equipment, and perform device-to-multidevice transmission to the at least one receiving user equipment using the determined precoding matrices.

Another embodiment is directed to a computer program, embodied on a non-transitory computer readable medium, the computer program is configured to control a processor to perform a process. The process includes selecting at least one receiving user equipment for device-to-multidevice transmission, and receiving requested data rates from the selected at least one receiving user equipment. The process may further include acquiring channel state information matrices and identifying interference constraints to the cellular user equipment sharing the same frequency band as the at least one receiving user equipment. The process then includes determining precoding matrices using the acquired channel state information matrices and the identified interference constraints to the cellular user equipment, and performing device-to-multidevice transmission to the at least one receiving user equipment using the determined precoding matrices.

BRIEF DESCRIPTION OF THE DRAWINGS

For proper understanding of the invention, reference should be made to the accompanying drawings, wherein.

DETAILED DESCRIPTION

Figure 1:
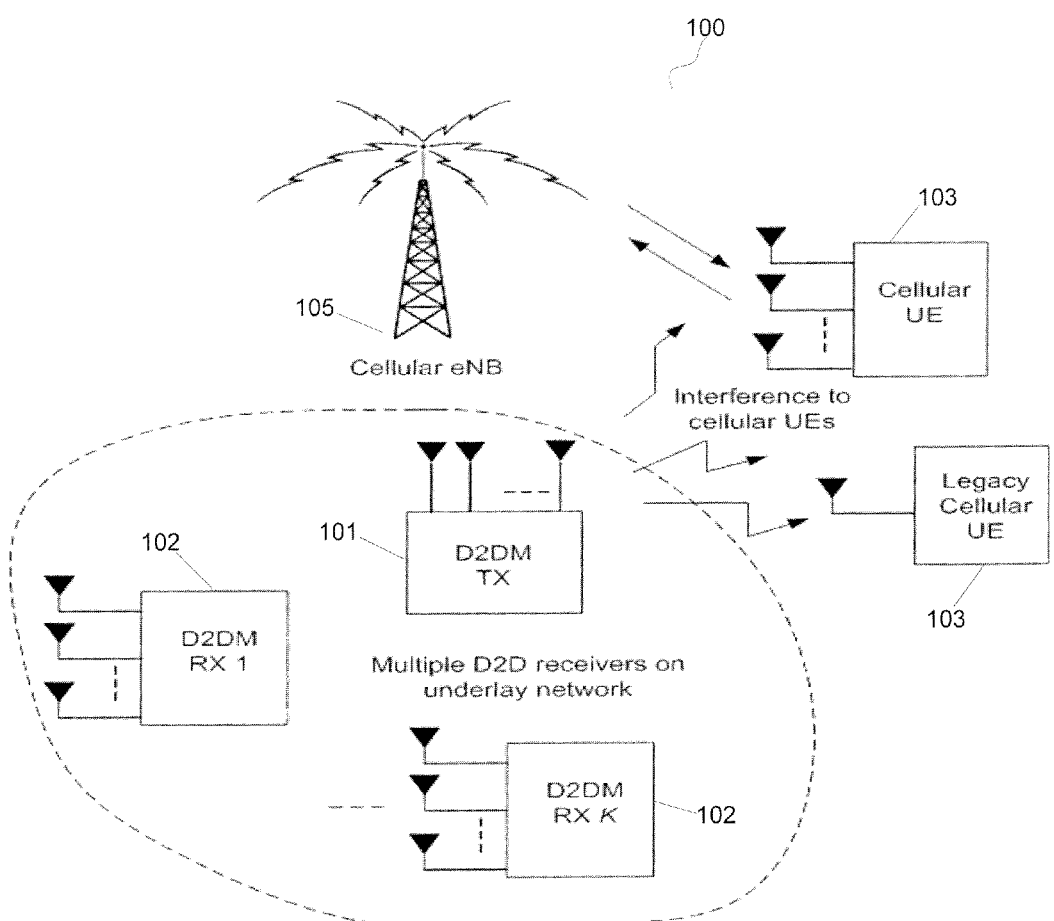
FIG. 1 illustrates a system according to one embodiment.

Forthcoming 3GPP LTE cellular radio and IEEE wireless local area network (LAN) standards are geared towards achieving ever-increasing levels of data rates to support gigabit communications within the available radio spectrum. One method of further increasing spectral efficiencies, especially for short-range communications, is to create device-to-device (D2D) links that enable direct communication of data between user equipment (UEs) without having to be routed through the enhanced NodeB (eNodeB).

A simple approach towards ensuring the coexistence of D2D and cellular UEs (C-UEs) is to partition the overall bandwidth into orthogonal portions and assign a dedicated resource (i.e., bandwidth) for D2D communications. This approach eliminates cross-network interference, but can be highly inefficient if the D2D resources are under-utilized. Therefore, current interest is centered on non-orthogonal resource sharing between D2D and C-UEs that share the same frequency band, which then requires careful interference management techniques to avoid degrading the QoS of the C-UEs. Therefore, it is of significant interest to devise D2D communication schemes that underlay conventional cellular networks in an energy-efficient and interference-aware manner.

A number of D2D transmission strategies with different levels of complexity have been proposed for underlay systems. A standard model is to consider the resource allocation for pairwise D2D communication, i.e., a point-to-point link between two single-antenna D2D devices underlaying a cellular network. Conventionally, the resource allocation and transmit power control for the D2D system is generally centralized and performed by the eNodeB.

Embodiments of the invention provide an improved paradigm called device-to-multidevice (D2MD) communications, where a transmitting device communicates simultaneously with multiple receiving devices in an energy-efficient manner, and the underlay communication is augmented with the use of multiple transmit and receive antennas. Embodiments of the invention provide certain advantages which include, but are not limited to, the following: 1) energy efficiency is explicitly considered as the optimization objective for the D2MD transmitter, which is important since these devices are handheld terminals with limited battery life; 2) serving multiple devices simultaneously reduces the overall duration of D2D communication compared to a time division scheme with pairwise D2D links, which decreases the duration of interference to cellular UEs; 3) autonomous D2MD operation without requiring centralized resource allocation from the eNodeB, which significantly reduces feedback overhead and latency; and 4) exploiting the multiple antennas available at D2MD devices enables greatly improved interference mitigation to C-UEs.

The accuracy of the channel state information (CSI) available at the D2MD transmitter is important for achieving high data rates to D2MD receivers and interference avoidance to C-UEs. If perfect CSI is assumed to be available, then all intra-D2MD interference and D2MD-to-cellular interference can be suppressed or eliminated. On the other hand, inaccurate or quantized CSI can significantly degrade the data rates of both systems. In another embodiment of the invention, an enhanced D2MD scheme that does not require explicit feedback of CSI matrices from the C-UEs and/or D2MD receivers is provided.

Embodiments of the invention seek to solve several key objectives simultaneously, by devising D2MD transmission strategies that are designed to be energy-efficient, to provide requested data rates to D2MD receivers, and simultaneously suppress interference to cellular UEs, without requiring centralized control or explicit CSI feedback.

One embodiment provides a D2MD transmission scheme that minimizes the transmit power needed to provide a set of data rates requested by scheduled D2MD UEs, while suppressing interference to C-UEs. FIG. 1 illustrates an example of a generic underlay network. FIG. 1 depicts an cellular network 100 including eNodeB 105 with underlay D2D devices 101, 102. According to an embodiment, an underlay device 101 transmits simultaneously to multiple underlay receivers 102, while interfering with nearby cellular UEs 103 that are operating on the same shared frequency.

The following nomenclature is introduced for purposes of exposition:
  Let the D2MD transmitter 101 be equipped with $N_t$ antennas and a total transmit power constraint $P_t$
  Let K devices be scheduled for D2MD reception, with the $k^{th}$ receiver requesting a data rate of $R_k$
  Let each of the K scheduled UEs selected for D2MD service be equipped with $N_u$ antennas
  Let a total of C cellular UEs 103 be equipped with $N_c$ antennas each
  Define $H_k$ as the channel matrix from the D2MD transmitter 101 to the $k^{th}$ D2MD receiver 102
  Define $G_i$ as the interfering channel matrix from the D2MD transmitter 101 to the $i^{th}$ C-UE 103

Embodiments of the invention assume a linear transmit precoding strategy at the D2MD transmitter 101, wherein the data vector for each UE has the form $T_k s_k$, where $T_k$ is the beamforming matrix for D2MD UE k and $s_k$ is the information signal vector. The following is the received signal model for the D2MD receivers 102 within the underlay network:

$$y_k = \underbrace{H_k T_k s_k}_{\text{desired signal}} + \underbrace{H_k \sum_{j=1, j \neq k}^{K} T_j s_j}_{\text{intra-D2MD interference}} + n_k,$$

where the interference-plus-noise vector $n_k$ includes background additive white Gaussian noise (AWGN) and co-channel interference from the cellular network. The cellular UEs 103 (if assumed to be in downlink mode) receive the signal:

$$u_i = \underbrace{B_i T_i s_i}_{\text{desired signal}} + \underbrace{G_i \sum_{k=1}^{K} T_k s_k}_{\text{underlay interference}} + w_k$$

where $B_i$ is the downlink channel matrix from the multi-antenna eNodeB 105 to the $i^{th}$ C-UE 103, $T_i$ is the precoding matrix for the $i^{th}$ C-UE 103, and $s_i$ is the information signal vector to the $i^{th}$ C-UE 103, and the interference-plus-noise vector $w_k$ includes background AWGN noise and inter-user interference within the cellular network.

In one aspect, assuming perfect CSI, embodiments of the invention obtain the optimal transmit covariance matrices $S_k$ for each of the K scheduled UEs that require the minimal possible transmit power to approximately satisfy the requested D2MD rates, wherein the optimal beamforming matrix $T_k$ and power allocation are embedded within $S_k$ as $S_k = T_k T_k^H$:

$$\min_{S_1, \ldots, S_K} Tr\left(\sum_{k=1}^{K} S_k\right) \quad (1)$$

$$\text{s.t.} \quad Tr(H_k S_k H_k^H) = f(2^{R_k}), k = 1, \ldots, K$$

$$Tr(H_j S_k H_j^H) \leq \lambda_k, j, k = 1, \ldots, K, j \neq k$$

$$Tr(G_i S_k G_i^H) \leq \eta_i, \forall k, i = 1, \ldots, C$$

$$S_k \succ 0, k = 1, \ldots, K$$

which is a semi-definite program with a convex objective function and convex constraints, and can be solved numerically to obtain a globally optimal solution. Here, f(.) is a deterministic function that maps the requested data rate $R_k$ to an equivalent received signal power level for each D2DM receiver 102 (assuming some transmit-side knowledge of the D2MD UE background noise covariance), while Tr(A) is the trace operator on matrix argument A. Note that the D2MD transmitter 101 does not need information of the cellular downlink channel matrices B, or the statistics of the C-UE 103 interference-plus-noise vectors. Embodiments of the invention allow for multiple data streams to be transmitted to each D2MD receiver 102 via spatial multiplexing, and is not restricted to per-UE beamforming.

The above embodiment simultaneously suppresses the interference between D2MD UEs 101, 102 to below pre-specified thresholds $\lambda_k$, and the interference to C-UEs 103 to below pre-specified thresholds $\eta_i$ that can be distinct for different UEs. As an example, the inter-D2MD interference levels $\lambda_k$ can be identically set to zero via generalized zero-forcing, or be set equal to the background noise power, or be variable according to UE-specific conditions. The values of the interference thresholds $\eta_i$ can be set arbitrarily close to zero, be pre-determined by the D2MD transmitter 101, or be reported from the eNodeB 105.

It should be noted that the transmission scheme provided according to an embodiment in equation (1) differs from block-diagonalization (BD) in a number of important ways. An example of a BD-based power minimization scheme is provided in Sec. III-B of Q. Spencer and A. L. Swindlehurst, "Zero-Forcing Methods for Downlink Spatial Multiplexing in Multi-User MIMO Channels." *IEEE Trans. Signal Processing*, February, 2004 (hereinafter, "Zero-Forcing Methods"). There are three major differences from the proposed approach:

- In the Zero-Forcing Methods paper, since the UE precoders are designed to satisfy the BD property, the precoder for each UE is designed separately based on the singular value decomposition (SVD) of the interfering downlink D2MD channels. There is no SVD step according to embodiments of the invention and all precoders are designed jointly without needing to satisfy any BD criterion.
- In the Zero-Forcing Methods paper, in the second stage, power allocation for each UE is performed via the waterfilling algorithm. There is no waterfilling applied according to certain embodiments of the invention since the precoding and power allocation is computed jointly.
- The BD algorithm in the Zero-Forcing Methods paper is incapable of suppressing interference to neighboring UEs, which is one of the key aspects of some embodiments of the invention.

Figure 2:
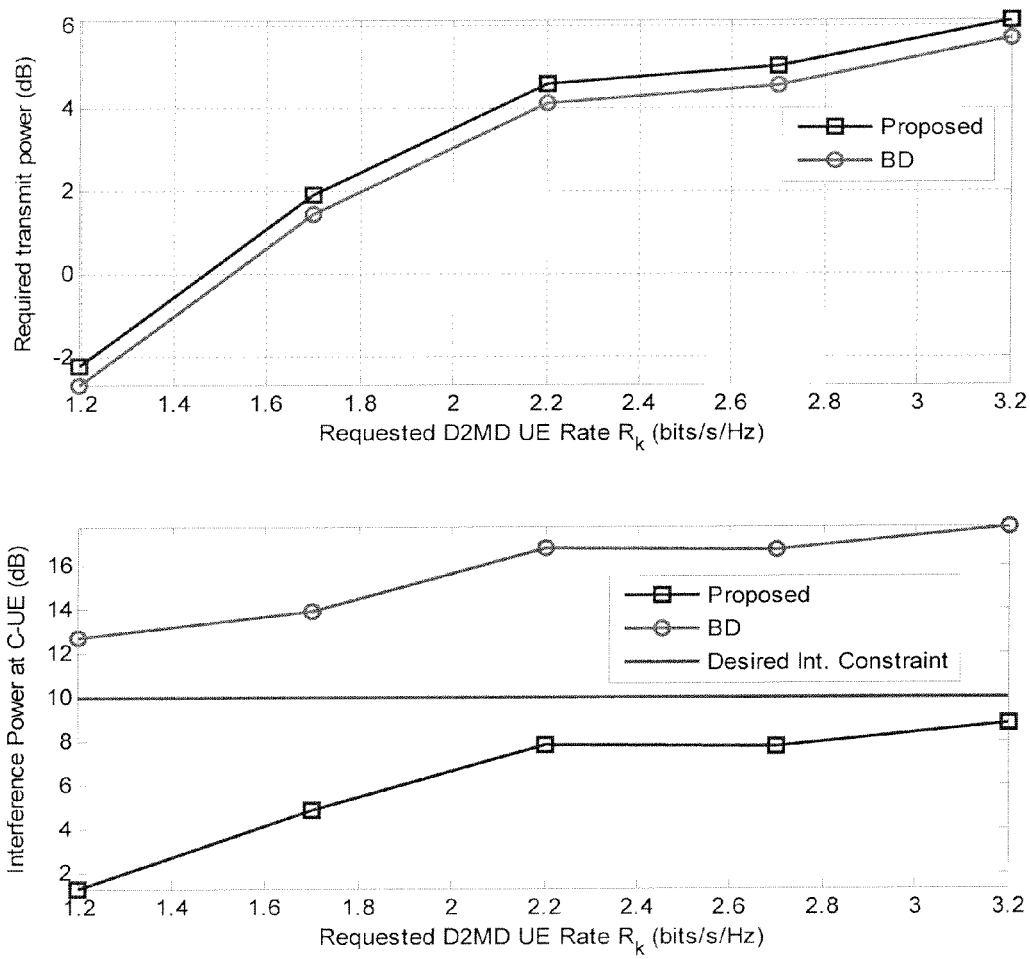
FIG. 2 illustrates graphs showing performance metrics according to an embodiment.

FIG. 2 illustrates a performance comparison between the power consumption and C-UE interference levels of embodiments of the invention and that of BD. As mentioned above, the BD scheme does not suppress C-UE interference. According to this example, there are 4 D2MD UEs and 2 C-UEs with 2 antennas each, and the D2MD transmitter has 4 antennas. In one embodiment, the transmit power is set to $P_t=200$, with D2MD interference constraint $\lambda_k=5$ and C-UE interference constraint $\eta_i = P_t/K$. According to an embodiment, the transmit power $P_t$ may be the same as the transmit signal-to-noise ratio, as the noise power is normalized to 1. Therefore, the transmit power $P_t$ can be represented in dB or dBm by taking the logarithm of the given absolute value, where $\lambda_k$ is given as an absolute value. For a Rayleigh fading scenario, the power consumption of the proposed scheme is close to that of BD, but with the added benefit of a significant reduction in interference to the C-UEs.

In another embodiment, if only statistical information (such as channel mean and covariance) of the interfering channels to the C-UEs 103 are available, then the following optimization problem is solved with a statistical C-UE interference constraint:

$$\min_{S_1,\ldots,S_K} Tr\left(\sum_{k=1}^{K} S_k\right) \quad (2)$$

s.t. $Tr(H_k S_k H_k^H) = f(2^{R_k}), k = 1, \ldots, K$ $Tr(H_j S_k H_j^H) \le \lambda_k, j, k = 1, \ldots, K, j \ne k$ $Tr(S_k E\{G_i^H G_i\}) \le \eta_i, \forall k, i = 1, \ldots, C$ $S_k \succ 0, k = 1, \ldots, K$ where the statistical information of the interfering channels is defined by $E\{G_i^H G_i\}$.

In another embodiment, if the D2MD receivers 102 post-multiply their received signals $y_k$ with a linear receive decoding matrix $D_k$ prior to data detection, then the D2MD transmitter 101 performs the transmit optimization with the effective channel matrices $D_k H_k$. However, the D2MD receivers 102 do not necessarily have to explicitly feedback their decoding matrices to the D2MD transmitter 101, which can pre-compute an estimate of $D_k$ based on its knowledge of the CSI. For example, if the D2MD UEs 102 employ a zero-forcing or matched-filter receiver matrix. If the D2MD UEs 102 employ an optimal minimum mean square error (MMSE) interference rejection combining (IRC) receiver as $D_k$, then the D2MD transmitter 101 can use its own received interference-plus-noise covariance matrix to estimate the actual receiver-side $D_k$, since the dominant interferer for all co-located D2MD devices is the cellular eNodeB 105.

In another embodiment, if the D2MD transmit precoding matrices must be selected from a predefined and discrete set of matrices, then the selection is made so as to adhere as much as possible to the C-UE interference constraints. The set of possible D2MD precoding matrices may or may not be the same as that available to the C-UE system. The D2MD transmitter 101 may or may not be aware of the precoders in use in the C-UE network, and if this information is available it may be exploited to determine the selection of D2MD precoding matrices. The rate requirements of the D2MD receivers can be accommodated by appropriately adjusting the applied coding and modulation schemes.

If perfect CSI regarding the outgoing channel matrices $H_k$ and $G_i$ is not available to the D2MD transmitter, then it becomes more difficult to eliminate inter-user and cross-network interference. Therefore, another embodiment assumes a worst case scenario that no a priori CSI is available at the D2MD transmitter 101 for either the D2MD 102 or C-UEs 103, i.e., all matrices $H_k$ and $G_i$ are unknown at the beginning.

For TDD systems, the reciprocity of the incoming and outgoing channels at the D2MD transmitter can be exploited to obtain estimates of $G_i$ based on signals received at the D2MD transmitter, for example, during the cellular uplink phase. A short training phase can be implemented from the D2MD receivers 102 to allow the D2MD transmitter 101 to estimate $H_k$.

For FDD systems, the realizations of the incoming and outgoing (or uplink and downlink) channels are uncorrelated due to the frequency separation. However, a statistical or long-term correlation still exists even in the FDD case, since the signals in both directions pass through the same macroscopic propagation environment. Mathematical details can be found in the 2001 IEEE publication "Downlink channel covariance matrix (DCCM) estimation and its applications in wireless DS-CDMA systems,"—IEEE JSAC, and implementation aspects in WO2000059072, entitled "Beamforming method and device" for direction-of-arrival estimation-based schemes.

Therefore, in this embodiment the statistical correlation of uplink and downlink channels in FDD systems are leveraged as follows:

- The D2MD transmitter 101 estimates the incoming channel spatial correlation matrices $C_{i,k}$ of the D2MD receivers 102 and/or C-UEs 103, either in the space-time or space-frequency domain over a finite averaging window.
- The incoming spatial correlation matrices are transformed to the outgoing (equivalently, downlink with respect to the D2MD transmitter 101) spatial correlation matrices $C_{o,k}$ by multiplication with a frequency calibration matrix F. F is a deterministic function of the antenna array geometry, does not require direction-of-arrival estimation, and can be computed off-line.

The D2MD transmitter 101 performs its transmit optimization on the outgoing channel spatial correlation matrices.

Embodiments of the invention provide several distinct advantages. For example, embodiments of the invention explicitly consider energy efficiency as the optimization objective for the D2MD transmitter 101, which is important since these devices are handheld terminals with limited battery life. Additionally, serving multiple devices simultaneously reduces the overall duration of D2D communication compared to a time division scheme with pairwise D2D links, which decreases the duration of interference to cellular UEs 103. Autonomous D2MD operation without requiring centralized resource allocation from the eNodeB 105 significantly reduces feedback overhead and latency.

Further, exploiting the multiple antennas available at D2MD devices enables greatly improved interference mitigation to C-UEs 103. Also, embodiments of the invention allow for multiple data streams to be transmitted to each D2MD receiver 102 via spatial multiplexing, and is not restricted to per-UE beamforming. According to certain embodiments, explicit feedback of the channel matrices of the D2MD receivers 102 and cellular UEs 103 is not required. Similarly, explicit feedback of the decoding matrices of D2MD receivers 102 is not required. In addition, multiple protected cellular UEs 103 can be accommodated according to certain embodiments of the invention.

Figure 3:
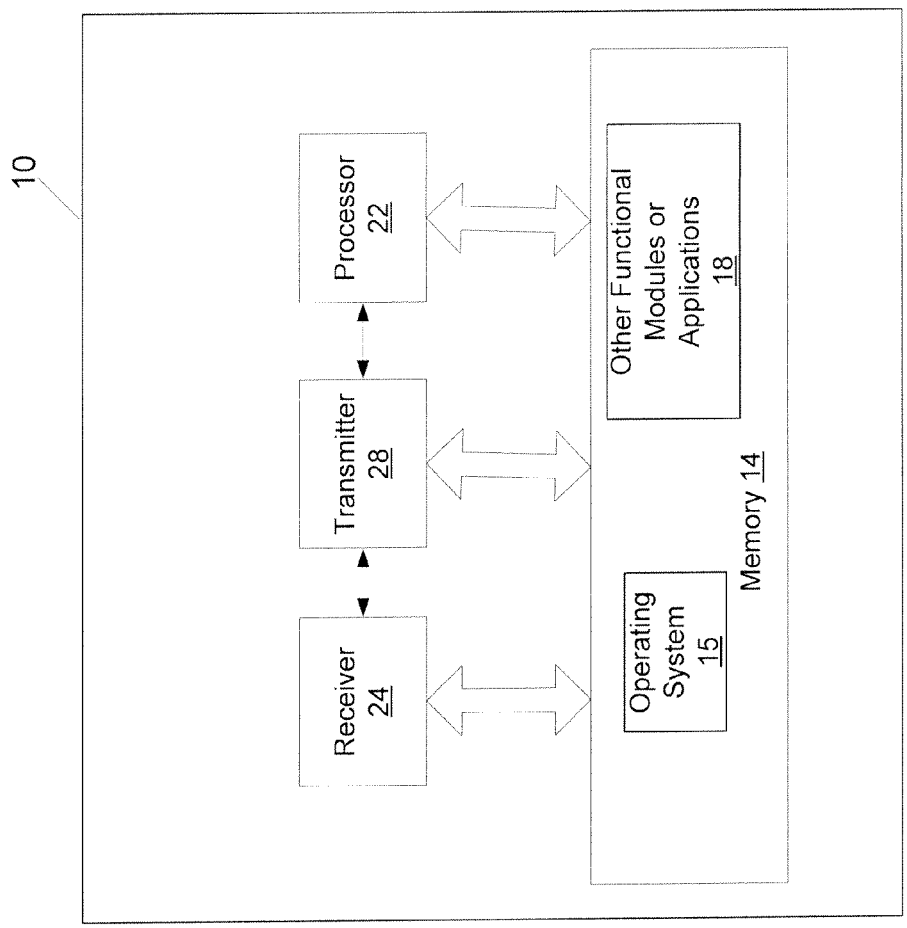
FIG. 3 illustrates an apparatus according to one embodiment.

FIG. 3 illustrates an apparatus 10 configured to perform energy efficient device-to-multidevice (D2MD) communication with interference suppression, in accordance with one embodiment. In one embodiment, apparatus 10 may be UE 101 illustrated in FIG. 1. UE 101, as depicted in FIG. 1, may be a D2MD transmitter. Apparatus 10 includes a processor 22 for processing information and executing instructions or operations. Processor 22 may be any type of general or specific purpose processor. While a single processor 22 is shown in FIG. 3, multiple processors may be utilized according to other embodiments.

Apparatus 10 further includes a memory 14, coupled to processor 22, for storing information and instructions to be executed by processor 22. Memory 14 can be comprised of any combination of random access memory ("RAM"), read only memory ("ROM"), static storage such as a magnetic or optical disk, or any other type of non-transitory machine or computer readable media.

Apparatus 10 may further include a transmitter 28 for transmitting information, such as data and/or control signals. Apparatus 10 also includes receiver 24 for receiving information including data and/or control signals. In some examples, the receiver and transmitter functionality may be implemented in a single transceiver unit.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, memory 14 and the computer program code stored thereon may be configured, with processor 22, to cause the apparatus 10 to select one or more receiving devices for receiving a D2MD transmission from apparatus 10. In one embodiment, the receiving devices may be D2MD receivers.

According to some embodiments, memory 14 and the computer program code stored thereon may further be configured, with processor 22, to cause the apparatus 10 to receive requested data rates from the selected receiving devices, and to acquire CSI matrices. Apparatus 10 may then further be caused to identify interference constraints to the C-UEs sharing the same frequency band as the receiving devices, to determine precoding matrices using the acquired CSI matrices and the identified interference constraints to the C-UEs, and to perform D2MD transmission to the receiving devices using the determined precoding matrices.

In one embodiment, memory 14 and the computer program code stored thereon may further be configured, with processor 22, to cause the apparatus 10 to determine the precoding matrices by selecting precoding matrices from a discrete set of allowable precoding matrices. According to some embodiments, the precoding matrices may be minimum power transmit precoding matrices. Therefore, in an embodiment, memory 14 and the computer program code stored thereon may further be configured, with processor 22, to cause the apparatus 10 to determine the precoding matrices by determining minimum power transmit precoding matrices using the acquired CSI matrices and the identified interference constraints to the C-UEs.

According to some embodiments, apparatus 10 may be embodied as a UE, mobile station or terminal, such as a mobile telephone, smart phone, personal data assistant (PDA), laptop, netbook, or any other device capable of wireless communication. In other embodiments, apparatus 10 may be embodied as an eNB or other network element.

Figure 4:
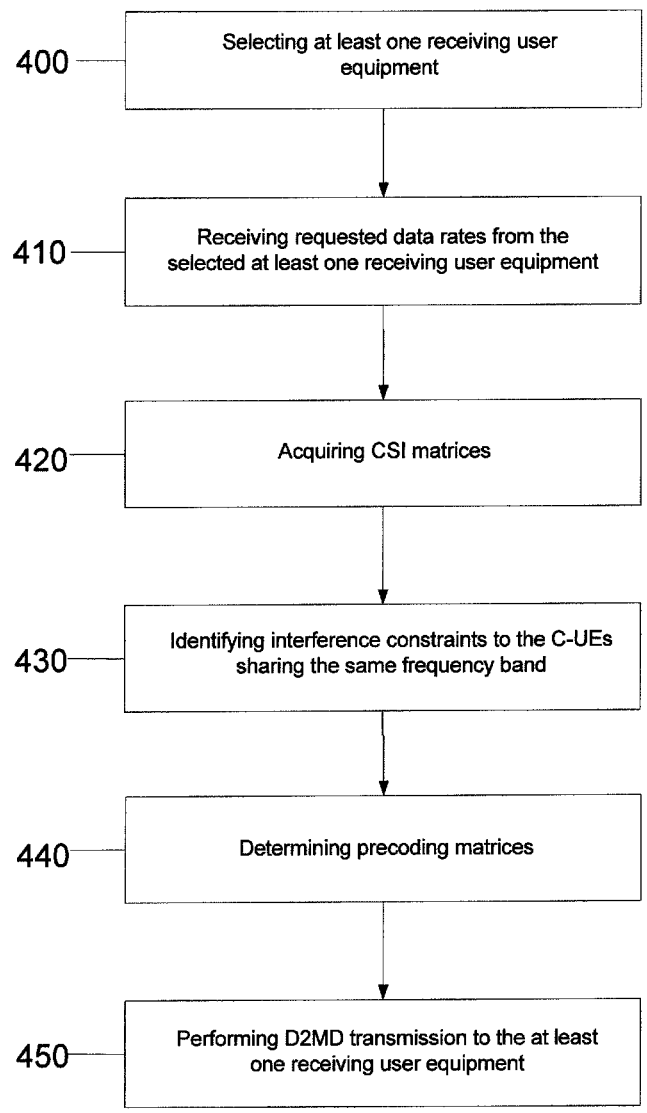
FIG. 4 illustrates a flow chart of a method according to an embodiment.

FIG. 4 illustrates a flow diagram of a method for performing energy efficient device-to-multidevice (D2MD) communication with interference suppression. In some embodiments, the method illustrated in FIG. 4 may be performed by the apparatus 10 discussed above in connection with FIG. 3. The method includes, at 400, selecting at least one receiving user equipment for D2MD transmission, and, at 410, receiving requested data rates from the selected at least one receiving user equipment. The method may further include, at 420, acquiring CSI matrices and, at 430, identifying interference constraints to the C-UEs sharing the same frequency band as the at least one receiving user equipment. The method then includes, at 440, determining precoding matrices using the acquired CSI matrices and the identified interference constraints to the C-UEs and, at 450, performing D2MD transmission to the at least one receiving user equipment using the determined precoding matrices.

According to some embodiments, determining the precoding matrices may include selecting precoding matrices from a discrete set of allowable precoding matrices. Additionally, in one embodiment, determining the precoding matrices may include determining minimum power transmit precoding matrices using the acquired CSI matrices and the identified constraints to the C-UEs.

In some embodiments, the functionality of the flow diagram of FIG. 4, or that of any other method described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Thus, another embodiment of the invention may include a computer program embodied on a computer readable medium. The computer program is configured to control a processor to perform a process. The process may include selecting at least one receiving user equipment for D2MD transmission, and receiving requested data rates from the selected at least one receiving user equipment. The process may further include acquiring CSI matrices and identifying interference constraints to the C-UEs sharing the same frequency band as the at least one receiving user equipment. The process then includes computing minimum-power transmit precoding matrices using the acquired CSI matrices, and performing D2MD transmission to the at least one receiving user equipment using the computed minimum-power transmit precoding matrices.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   selecting, by a transmitting user equipment, at least one receiving user equipment;
   receiving requested data rates from the selected at least one receiving user equipment;
   acquiring channel state information matrices;
   identifying interference constraints to cellular user equipment sharing same frequency band as the at least one receiving user equipment;
   determining precoding matrices using the acquired channel state information matrices and the identified interference constraints to the cellular user equipment; and
   performing device-to-multidevice transmission from the transmitting user equipment to the at least one receiving user equipment using the determined precoding matrices.

2. The method according to claim 1, wherein the determining of the precoding matrices comprises selecting precoding matrices from a discrete set of allowable precoding matrices.

3. The method according to claim 1, wherein the determining of the precoding matrices comprises determining minimum power transmit precoding matrices using the acquired channel state information matrices and the identified interference constraints to the cellular user equipment.

4. The method according to claim 3, wherein the determining of the minimum-power transmit precoding matrices comprises solving the following optimization problem:

$$\min_{S_1,\ldots,S_K} Tr\left(\sum_{k=1}^{K} S_k\right)$$

$$\text{s.t.} \quad Tr(H_k S_k H_k^H) = f(2^{R_k}), k = 1, \ldots, K$$

$$Tr(H_j S_k H_j^H) \le \lambda_k, j, k = 1, \ldots, K, j \ne k$$

$$Tr(G_i S_k G_i^H) \le \eta_i, \forall k, i = 1, \ldots, C$$

$$S_k \succ 0, k = 1, \ldots, K,$$

wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

5. The method according to claim 3, wherein the determining of the minimum-power transmit precoding matrices comprises solving the following optimization problem:

$$\min_{S_1,\ldots,S_K} Tr\left(\sum_{k=1}^{K} S_k\right)$$

$$\text{s.t.} \quad Tr(H_k S_k H_k^H) = f(2^{R_k}), k = 1, \ldots, K$$

$$Tr(H_j S_k H_j^H) \le \lambda_k, j, k = 1, \ldots, K, j \ne k$$

$$Tr(S_k E\{G_i^H G_i\}) \le \eta_i, \forall k, i = 1, \ldots, C$$

$$S_k \succ 0, k = 1, \ldots, K,$$

wherein statistical information of interfering channels to the cellular user equipment is defined by $E\{G_i^H G_i\}$, and
wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

6. The method according to claim 1, wherein the acquiring of the channel state information matrices comprises acquiring the channel state information matrices using instantaneous reciprocity for a time division duplexing system.

7. The method according to claim 1, wherein the acquiring of the channel state information matrices comprises acquiring the channel state information matrices using statistical reciprocity for a frequency division duplexing system.

8. The method according to claim 1, wherein the performing of the device-to-multidevice transmission comprises transmitting multiple data streams to each of the at least one receiving user equipment via spatial multiplexing.

9. The method according to claim 1, wherein the transmitting user equipment comprises a device-to-multidevice transmitter.

10. The method according to claim 1, wherein the at least one receiving user equipment comprises a device-to-multidevice receiver.

11. An apparatus, comprising:
at least one processor; and
at least one memory including computer program code,
the at least one memory and the computer program code configured, with the at least one processor, to cause the apparatus at least to
select at least one receiving user equipment;
receive requested data rates from the selected at least one receiving user equipment;
acquire channel state information matrices;
identify interference constraints to cellular user equipment sharing same frequency band as the at least one receiving user equipment;
determine precoding matrices using the acquired channel state information matrices and the identified interference constraints to the cellular user equipment; and
perform device-to-multidevice transmission to the at least one receiving user equipment using the determined precoding matrices.

12. The apparatus according to claim 11, wherein the at least one memory and the computer program code are further configured, with the at least one processor, to cause the apparatus at least to determine the precoding matrices by selecting precoding matrices from a discrete set of allowable precoding matrices.

13. The apparatus according to claim 11, wherein the at least one memory and the computer program code are further configured, with the at least one processor, to cause the apparatus at least to determine the precoding matrices by determining minimum power transmit precoding matrices using the acquired channel state information matrices and the identified interference constraints to the cellular user equipment.

14. The apparatus according to claim 13, wherein the at least one memory and the computer program code are further configured, with the at least one processor, to cause the apparatus at least to determine the minimum-power transmit precoding matrices by solving the following optimization problem:

$$\min_{S_1,\ldots,S_K} Tr\left(\sum_{k=1}^{K} S_k\right)$$

$$\text{s.t. } Tr(H_k S_k H_k^H) = f(2^{R_k}), k = 1, \ldots, K$$
$$Tr(H_j S_k H_j^H) \le \lambda_k, j, k = 1, \ldots, K, j \ne k$$
$$Tr(G_i S_k G_i^H) \le \eta_i, \forall k, i = 1, \ldots, C$$
$$S_k \succ 0, k = 1, \ldots, K,$$

wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

15. The apparatus according to claim 13, wherein the at least one memory and the computer program code are further configured, with the at least one processor, to cause the apparatus at least to determine the minimum-power transmit precoding matrices by solving the following optimization problem:

$$\min_{S_1,\ldots,S_K} Tr\left(\sum_{k=1}^{K} S_k\right)$$

$$\text{s.t. } Tr(H_k S_k H_k^H) = f(2^{R_k}), k = 1, \ldots, K$$
$$Tr(H_j S_k H_j^H) \le \lambda_k, j, k = 1, \ldots, K, j \ne k$$
$$Tr(S_k E\{G_i^H G_i\}) \le \eta_i, \forall k, i = 1, \ldots, C$$
$$S_k \succ 0, k = 1, \ldots, K,$$

wherein statistical information of interfering channels to the cellular user equipment is defined by $E\{G_i^H G_i\}$, and
wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

16. The apparatus according to claim 11, wherein the at least one memory and the computer program code are further configured, with the at least one processor, to cause the apparatus at least to acquire the channel state information matrices using instantaneous reciprocity for a time division duplexing system.

17. The apparatus according to claim 11, wherein the at least one memory and the computer program code are further configured, with the at least one processor, to cause the apparatus at least to acquire the channel state information matrices using statistical reciprocity for a frequency division duplexing system.

18. The apparatus according to claim 11, wherein the at least one memory and the computer program code are further configured, with the at least one processor, to cause the apparatus at least to perform the device-to-multidevice transmission by transmitting multiple data streams to each of the at least one receiving user equipment via spatial multiplexing.

19. The apparatus according to claim 11, wherein the apparatus comprises a device-to-multidevice transmitter.

20. A computer program, embodied on a non-transitory computer readable medium, the computer program configured to control a processor to perform a process, comprising:
selecting at least one receiving user equipment;
receiving requested data rates from the selected at least one receiving user equipment;
acquiring channel state information matrices;
identifying interference constraints to cellular user equipment sharing same frequency band as the at least one receiving user equipment;
determining precoding matrices using the acquired channel state information matrices and the identified interference constraints to the cellular user equipment; and performing device-to-multidevice transmission to the at least one receiving user equipment using the determined precoding matrices.

21. The computer program according to claim 20, wherein the determining of the precoding matrices comprises selecting precoding matrices from a discrete set of allowable precoding matrices.

22. The computer program according to claim 20, wherein the determining of the precoding matrices comprises determining minimum power transmit precoding matrices using the acquired channel state information matrices and the identified interference constraints to the cellular user equipment.

23. The computer program according to claim 22, wherein the determining of the minimum-power transmit precoding matrices comprises solving the following optimization problem:

$$\min_{S_1,\ldots,S_K} Tr\left(\sum_{k=1}^{K} S_k\right)$$

$$\text{s.t.} \quad Tr(H_k S_k H_k^H) = f(2^{R_k}), k = 1, \ldots, K$$

$$Tr(H_j S_k H_j^H) \le \lambda_k, j, k = 1, \ldots, K, j \ne k$$

$$Tr(G_i S_k G_i^H) \le \eta_i, \forall k, i = 1, \ldots, C$$

$$S_k \succ 0, k = 1, \ldots, K,$$

wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

24. The computer program according to claim 22, wherein the determining of the minimum-power transmit precoding matrices comprises solving the following optimization problem:

$$\min_{S_1,\ldots,S_K} Tr\left(\sum_{k=1}^{K} S_k\right)$$

$$\text{s.t.} \quad Tr(H_k S_k H_k^H) = f(2^{R_k}), k = 1, \ldots, K$$

$$Tr(H_j S_k H_j^H) \le \lambda_k, j, k = 1, \ldots, K, j \ne k$$

$$Tr(S_k E\{G_i^H G_i\}) \le \eta_i, \forall k, i = 1, \ldots, C$$

$$S_k \succ 0, k = 1, \ldots, K,$$

wherein statistical information of interfering channels to the cellular user equipment is defined by $E\{G_i^H G_i\}$, and
wherein Tr is a trace operator, $S_k$ is covariance matrix for each of k scheduled user equipment, $G_i$ is interfering channel matrix to $i^{th}$ cellular user equipment, and $H_k$ is channel matrix to $k^{th}$ receiving user equipment.

25. The computer program according to claim 20, wherein the acquiring of the channel state information matrices comprises acquiring the channel state information matrices using instantaneous reciprocity for a time division duplexing system.

26. The computer program according to claim 20, wherein the acquiring of the channel state information matrices comprises acquiring the channel state information matrices using statistical reciprocity for a frequency division duplexing system.

* * * * *